United States Patent
Takemasa (10) Patent No.: US 7,940,017 B2
(45) Date of Patent: May 10, 2011

(54) LOCK DETECTION METHOD AND LOCK DETECTION CIRCUIT FOR MOTOR FOR POWER-FOLDING MIRROR

(75) Inventor: Noriyuki Takemasa, Yaizu (JP)

(73) Assignee: Murakami Corporation, Shizuoka (JP)

( * ) Notice: Subject to any disclaimer, the term of this patent is extended or adjusted under 35 U.S.C. 154(b) by 465 days.

(21) Appl. No.: 12/123,715

(22) Filed: May 20, 2008

(65) Prior Publication Data

US 2009/0058332 A1    Mar. 5, 2009

(30) Foreign Application Priority Data

Aug. 31, 2007 (JP) ................................. 2007-225855

(51) Int. Cl.
*H02P 1/00* (2006.01)
(52) U.S. Cl. ............... 318/280; 318/400.22; 318/400.29
(58) Field of Classification Search ............. 318/400.01, 318/400.06, 400.26, 400.28, 400.29, 799, 318/811, 280, 432, 400.22, 650; 701/49; 74/502.1
See application file for complete search history.

(56) References Cited

U.S. PATENT DOCUMENTS

| | | | |
|---|---|---|---|
| 5,514,940 | A | 5/1996 | Okamoto |
| 6,329,777 | B1 * | 12/2001 | Itabashi et al. ................. 318/434 |
| 6,900,605 | B2 * | 5/2005 | Nakaho ........................... 318/280 |
| 6,917,169 | B2 * | 7/2005 | Nagasawa et al. ............. 318/280 |
| 7,492,056 | B2 * | 2/2009 | Koutsandreas et al. ...... 307/10.2 |
| 2006/0186682 | A1 | 8/2006 | Kay |
| 2008/0088960 | A1 | 4/2008 | Sim |
| 2008/0315804 | A1 | 12/2008 | Nishibe et al. |

FOREIGN PATENT DOCUMENTS

| | | |
|---|---|---|
| EP | 2006998 | 12/2008 |
| GB | 2292231 | 2/1996 |
| JP | 8-40146 | 2/1996 |

OTHER PUBLICATIONS

English language Abstract of JP 8-40146, Feb. 13, 1996.
U.S. Appl. No. 12/079,279 (unpublished), filed Mar. 26, 2008.

* cited by examiner

*Primary Examiner* — Walter Benson
*Assistant Examiner* — Antony M Paul
(74) *Attorney, Agent, or Firm* — Greenblum & Bernstein, P.L.C.

(57) ABSTRACT

The present invention is intended to, when rotation of a mirror rotation unit in a power-folding mirror is mechanically locked and its drive motor is thereby locked, make it possible to correctly detect this locked state. A motor 10 for a power-folding mirror is reversibly driven by an H-bridge drive circuit 12 formed of FETs 1 to 4. When the motor 10 is driven in normal rotation by turning the FETs 1 and 4 on and turning the FETs 2 and 3 off, the FET 1 is periodically turned off to detect a voltage of a terminal 10a of the motor 10 by means of a voltage detection circuit 14. When the FET 1 is turned off and the motor 10 is not locked, the motor 10 generates power by means of its inertial rotation, and when locked, the motor 10 generates no power, so the voltage detected by the voltage detection circuit 14 changes according to whether or not the motor 10 is locked. A CPU 20 determines whether or not the motor 10 is locked according to the voltage detected by the voltage detection circuit 14.

4 Claims, 4 Drawing Sheets

LOCK DETECTION METHOD AND LOCK DETECTION CIRCUIT FOR MOTOR FOR POWER-FOLDING MIRROR

The disclosure of Japanese Patent Application No. JP2007-225855 filed on Aug. 31, 2007 including the specification, drawing and abstract is incorporated herein by reference in its entirety.

BACKGROUND OF THE INVENTION

1. Field of the Invention

The present invention relates to a technique capable of, when a drive motor is locked as a result of the rotation of a mirror rotation unit being mechanically locked in a power-folding mirror, correctly detecting this locked state.

2. Description of the Related Art

A power-folding mirror constitutes an outer mirror (mainly a door mirror) for a vehicle, and is constructed so that a mirror rotation unit (mirror housing and a part that rotates together with the mirror housing) is rotationally moved from a return position (use position or extended position) to a folded position, and also is rotationally moved from the folded position to the return position by means of driving a motor. The rotation of a power-folding mirror usually starts as a result of a motor being started by a driver's switch operation in the vehicle. Upon the start of the motor, the mirror rotation unit automatically moves from the return position toward the folded position (or from the folded position toward the return position). When this movement is mechanically locked by a stopper at the end position of the movement (the folded position or the return position), the locking is detected and the driving of the motor is automatically stopped.

For a method for detecting locking of a motor for a power-folding mirror, a method utilizing a value of current flowing in the motor (for example, the method described in Japanese Patent Laid-Open No. 8-40146) is commonly used. In other word, the value of current flowing in a motor during power being supplied to the motor becomes greater (i.e., lock current flows) when the motor is locked, compared to when the motor is not locked. Utilizing this principle, the current flowing in the motor is converted into a voltage via a resistance provided in the power supply line and monitored, and when the voltage value crosses a predetermined threshold value set to a voltage between the voltage when the motor is locked and the voltage when the motor is not locked, the motor is determined as being locked and then the power supply to the motor is halted.

Capabilities required for a power-folding mirror include ensuring the operation under every combination of a temperature in a predetermined temperature range (for example, −30° C. to +80° C.) and a drive voltage in a predetermined drive voltage range (for example, 8 V to 15 V). However, current flowing in the motor greatly fluctuates within this operation-ensured range whether the motor is rotating or locked, and it also greatly changes depending on the motor type, and accordingly, it is difficult to set an optimum threshold value for determining whether or not the motor is locked. In particular, when the difference between the current during the motor being operated and the current during the motor being locked is small, the threshold value setting is further difficult. Therefore, in order to avoid a phenomenon in which the mirror rotation unit stops in the middle of rotation because of an erroneous determination regarding whether or not the motor is locked, the setting may be configured so that power will continuously be supplied to the motor for a while even when the motor has been determined as being locked. However, in this method, even when a motor is actually got locked, the motor is continuously supplied with power for a while, so lock current will continuously flow for a long period of time, causing damage of the motor. Also, in a method in which whether or not the motor is locked is determined based on lock current, the threshold value must be set for every design change involving a change of motor, and thus, threshold value setting has been troublesome.

The present invention has been made in view of the aforementioned points and is intended to provide a lock detection method and a lock detection circuit for a motor for a power-folding mirror, which are capable of correctly detecting a motor-locked state.

SUMMARY OF THE INVENTION

A lock detection method for a motor for a power-folding mirror according to the present invention, the direct current brush motor for the power-folding mirror being reversibly driven by an H-bridge drive circuit formed of four switching elements, comprises: periodically turning off one switching element of a pair of switching elements, which are on, from among the four switching elements; detecting a voltage of a part whose voltage changes according to a voltage generated by the direct current brush motor during the off period; and determining whether or not the direct current brush motor as being in a locked state according to whether or not the detected voltage crosses a predetermined voltage between a voltage when the direct current brush motor is locked and a voltage when the direct current brush motor is not locked.

A lock detection circuit for a motor for a power-folding mirror according to the present invention comprises: an H-bridge drive circuit that reversibly drives the direct current brush motor for the power-folding mirror via four switching elements; a voltage detection circuit that detects a voltage of a part whose voltage changes according to a voltage generated by the direct current brush motor; and a lock determination circuit that periodically turns off one switching element of a pair of switching elements, which are on, from among the four switching elements, and determines whether or not the direct current brush motor is in a locked state according to whether or not a voltage detected by the voltage detection circuit during the off period crosses a predetermined voltage between a voltage when the direct current brush motor is locked and a voltage when the direct current brush motor is not locked.

More specifically, a lock detection circuit for a motor for a power-folding mirror according to the present invention can comprise: an H-bridge drive circuit for the motor for the power-folding mirror, the H-bridge drive circuit having first to fourth switching elements, one ends of the first and third switching elements being interconnected, one ends of the second and fourth switching elements being interconnected, another end of each of the first and second switching elements being connected to a battery, another end of each of the third and fourth switching elements being grounded, a direct current brush motor being connected between a point of connection of the first and third switching elements and a point of connection of the second and fourth switching elements, the H-bridge drive circuit driving the direct current brush motor in one direction by turning the first and fourth switching elements on and turning the second and third switching elements off, and driving the direct current brush motor in an opposite direction by turning the second and third switching elements on and turning the first and fourth switching elements off; a first voltage detection circuit having a resistance connected between one terminal of the direct current brush motor and a ground, the first voltage detection circuit generating a voltage according to a potential of the terminal of the direct current brush motor; a second voltage detection circuit having a resistance connected between another terminal of the direct current brush motor and the ground, the second voltage detection circuit generating a voltage according to a potential of the other terminal of the direct current brush motor; and a lock determination circuit that during the direct current brush motor being driven in the one direction by turning the first and fourth switching elements on and turning the second and third switching elements off, periodically turns the first switching element off and determines the direct current brush motor as being in a locked state when a voltage generated at the first voltage detection circuit during the off period is lower than a predetermined threshold value set to a voltage between a voltage when the direct current brush motor is not locked and a voltage when the direct current brush is locked, periodically turns the fourth switching element off and determines the direct current brush motor as being in a locked state when a voltage generated at the second voltage detection circuit during the off period is higher than a predetermined threshold value set to a voltage between a voltage when the direct current brush motor is not locked and a voltage when the direct current brush motor is locked, or periodically turns the fourth switching element off and determines the direct current brush motor as being in a locked state when a difference between a voltage generated at the first voltage detection circuit and a voltage generated at the second voltage detection circuit during the off period is lower than a predetermined threshold value set to a voltage between a voltage when the direct current brush motor is not locked and a voltage when the direct current brush motor is locked, and during the direct current brush motor being driven in the opposite direction by turning the second and third switching elements on and turning the first and fourth switching elements off, periodically turns the second switching element off and determines the direct current brush motor as being in a locked state when a voltage generated at the second voltage detection circuit during the off period is lower than a predetermined threshold value set to a voltage between a voltage when the direct current brush motor is not locked and a voltage when the direct current brush motor is locked, periodically turns the third switching element off and determines the direct current brush motor as being in a locked state when a voltage generated at the first voltage detection circuit during the off period is higher than a predetermined threshold value set to a voltage between a voltage when the direct current brush motor is not locked and a voltage when the direct current brush motor is locked, or periodically turns the third switching element off and determines the direct current brush motor as being a locked state when a difference between a voltage generated at the second voltage detection circuit and a voltage generated at the first voltage detection circuit during the off period is lower than a predetermined threshold value set to a voltage between a voltage when the direct current brush motor is not locked and a voltage when the direct current brush motor is locked.

A lock detection circuit for a motor for a power-folding mirror according to the present invention can also comprise: an H-bridge drive circuit for the motor for the power-folding mirror, the H-bridge drive circuit having first to fourth switching elements, one ends of the first and third switching elements being interconnected, one ends of the second and fourth switching elements being interconnected, another end of each of the first and second switching elements being connected to a battery, another end of each of the third and fourth switching elements being grounded, a direct current brush motor being connected between a point of connection of the first and third switching elements and a point of connection of the second and fourth switching elements, the H-bridge drive circuit driving the direct current brush motor in one direction by turning the first and fourth switching elements on and turning the second and third switching elements off, and driving the direct current brush motor in an opposite direction by turning the second and third switching elements on and turning the first and fourth switching elements off; a voltage detection circuit having a resistance connected between one terminal of the direct current brush motor and a ground, the voltage detection circuit generating a voltage according to a potential of the terminal of the direct current brush motor; and a lock determination circuit that during the direct current brush motor being driven in the one direction by turning the first and fourth switching elements on and turning the second and third switching elements off, periodically turns the first switching element off and determines the direct current brush motor as being in a locked state when a voltage generated at the voltage detection circuit during the off period is lower than a predetermined threshold value set to a voltage between a voltage when the direct current brush motor is not locked and a voltage when the direct current brush is locked, and during the direct current brush motor being driven in the opposite direction by turning the second and third switching elements on and turning the first and fourth switching elements off, periodically turns the third switching element off and determines the direct current brush motor as being in a locked state when a voltage generated at the voltage detection circuit during the off period is higher than a predetermined threshold value set to a voltage between a voltage when the direct current brush motor is not locked and a voltage when the direct current brush motor is locked.

According to the present invention: when one switching element of a pair of switching elements, which are on, from among four switching elements constituting an H-bridge drive circuit is periodically turned off, a drive motor (DC brush motor) for a power-folding mirror inertially rotates and generates power; meanwhile, when the drive motor is locked, even though the switching element is turned off, the motor generates no power; and therefore, a motor-locked state can be detected more correctly compared to the conventional methods using motor current detection, by detecting the voltage of a part whose voltage changes depending on the voltage generated by the drive motor (i.e., detecting whether or not power is generated). In particular, whether or not the motor is locked can be determined with no effect of battery voltage fluctuation, by detecting the voltage of a part whose voltage during the motor being locked becomes a ground potential, enabling more accurate detection of a motor-locked state. Also, according to the present invention, in many cases, even though a design change involving a change of motor is made, the threshold value need not be changed.

DETAILED DESCRIPTION OF THE PREFERRED EMBODIMENTS

Embodiment 1

Figure 1:
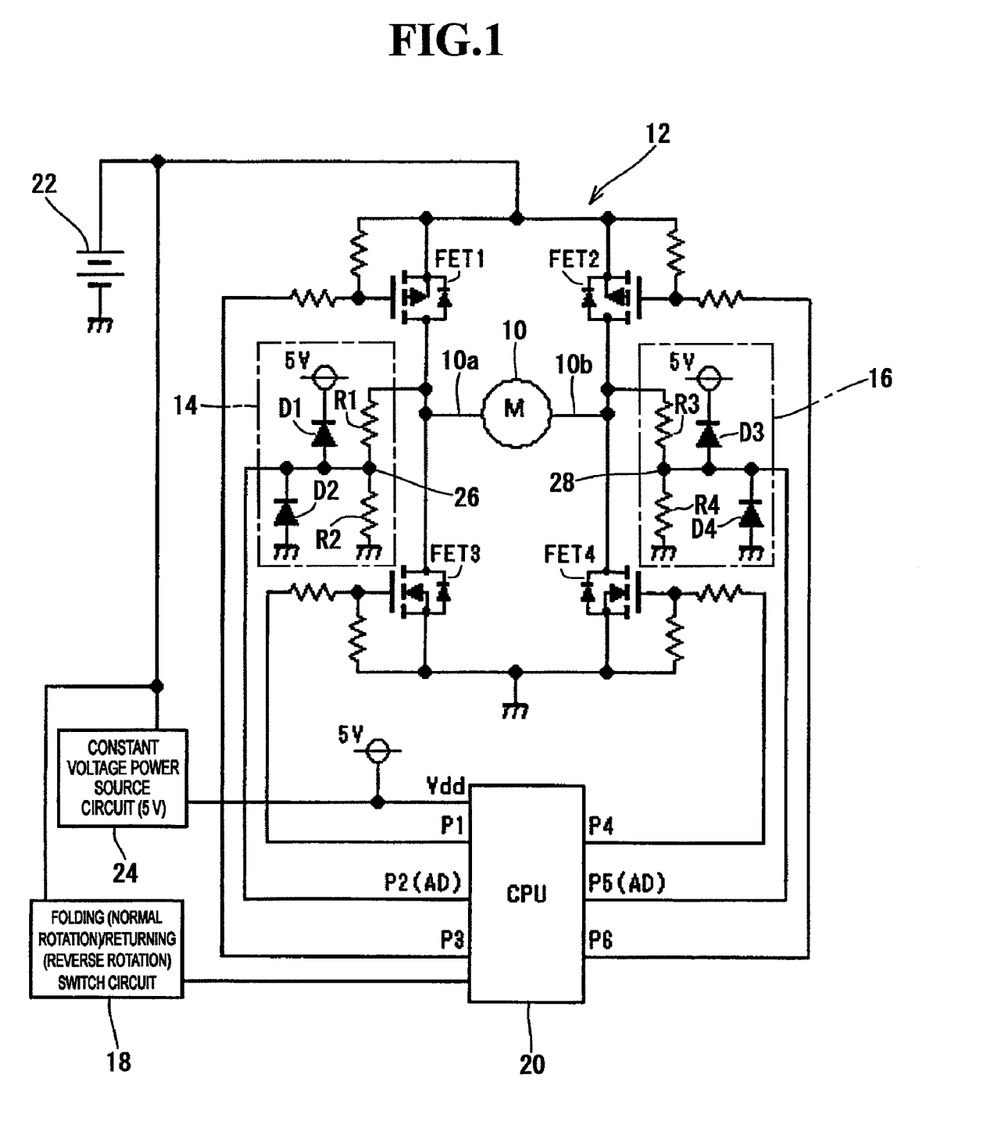
FIG. 1 is a circuit diagram illustrating embodiment 1 of the present invention.

An embodiment of the present invention is shown in FIG. 1. First, the overview of the entire circuit will be described. A motor 10 is a drive motor for a mirror rotation unit (not shown) for a power-folding mirror, and consists of a DC brush motor. Four FETs (electric field effect transistors) 1 to 4 constitutes an H-bridge drive circuit 12 for reversibly driving a motor 10. Voltage detection circuits 14 and 16 detect the voltages (potentials relative to ground) of one terminal 10a and the other terminal 10b of the motor 10, respectively. A switch circuit 18 is driven by a driver's mirror switch operation (an operation to instruct a movement in a folding direction or a returning direction) in the vehicle, and generates a command according to that operation. A CPU 20, upon the receipt of the command from the switch circuit 18, the relevant pair from among the FETs 1 to 4 is turned on to drive the motor 10 in the relevant direction. The CPU 20 continues to make the FETs 1 to 4 on once it receives the command from the switch circuit 18. During the driving of the motor 10, the CPU 20 monitors a voltage detected by the voltage detection circuit 14 or 16, determines the motor 10 as being in a locked state (a state in which the mirror rotation unit is mechanically locked at an end position of the movement, i.e., the folded position or the return position, by a stopper) when the voltage crosses (is larger than or smaller than) a predetermined threshold value, and turns the FETs 1 to 4 off to halt the power supply to the motor 10. A battery 22 is a 12 V battery to be mounted on a vehicle, and is used as a power source for driving the motor 10. A constant voltage power supply circuit 24 outputs a constant voltage of 5 V using the battery 22 as its power source. This constant voltage is used for a power source for driving the CPU 20, and a power source for operating each voltage limiter circuit in the voltage detection circuits 14 and 16.

Next, the details of the components of the circuits will be described. The H-bridge drive circuit 12 consists of four switching transistors: the FETs 1 and 2 each formed of a P-channel FET, and the FETs 3 and 4 each formed of an N-channel FET. The drains of the FETs 1 and 3 are interconnected, and the drains of the FETs 2 and 4 are interconnected. The sources of the FETs 1 and 2 are connected in common to a positive electrode of the battery 22, and the sources of the FETs 3 and 4 are grounded. The terminal 10a of the motor 10 is connected to the drains of the FETs 1 and 3, and the other terminal 10b is connected to the drains of the FETs 2 and 4.

The voltage detection circuit 14 consists of a resistive voltage divider circuit formed of serially-connected resistances R1 and R2, and a limiter circuit formed of diodes D1 and D2. One end of the serial connection circuit formed of the resistances R1 and R2 is connected to the terminal 10a of the motor 10, and the other end is grounded. A point of connection 26 of the resistances R1 and R2 is connected to an A/D conversion input terminal P2 of the CPU 20. Between the point of connection 26 of the resistances R1 and R2, and the 5 V constant potential, the diode D1 is connected in a forward direction from the point of connection 26 toward the 5 V constant potential. Between the ground potential and the point of connection 26 of the resistances R1 and R2, the diode D2 is connected in a forward direction from the ground potential toward the point of connection 26. According to the aforementioned configuration, a voltage resulting from the voltage of the terminal 10a of the motor 10 being divided by the resistances R1 and R2 is input to the A/D conversion input terminal P2 of the CPU 20 and detected. Also, when this divided voltage becomes equal or higher than a voltage of 5 V plus the diode D1's forward voltage, the diode D1 turns on, maintaining the voltage at 5 V plus the diode D1's forward voltage. Also, when the divided voltage becomes equal or lower than a voltage of 0 V minus the diode D2's forward voltage, the diode D2 turns on, maintaining the voltage at 0 V minus the diode D2's forward voltage.

The voltage detection circuit 16 is constructed in a manner similar to the voltage detection circuit 14. In other words, the voltage detection circuit 16 consists of a resistive voltage divider circuit formed of serially-connected resistances R3 and R4, and a limiter circuit formed of diodes D3 and D4. One end of the serial connection circuit formed of the resistances R3 and R4 is connected to the terminal 10b of the motor 10, and the other end is grounded. A point of connection 28 of the resistances R3 and R4 is connected to an A/D conversion input terminal P5 of the CPU 20. Between the point of connection 28 of the resistances R3 and R4, and the 5 V constant potential, the diode D3 is connected in a forward direction from the connection point 28 toward the 5 V constant potential. Between the ground potential and the point of connection 28 of the resistances R3 and R4, the diode D4 is connected in a forward direction from the ground potential toward the point of connection 28. According to the aforementioned configuration, a voltage resulting from the voltage of the terminal 10b of the motor 10 being divided by the resistances R3 and R4 is input to the A/D conversion input terminal P5 of the CPU 20 and detected. Also, when this divided voltage becomes equal or higher than a voltage of 5 V plus the diode D3's forward voltage, the diode D3 turns on, maintaining the voltage at 5 V plus the diode D3's forward voltage. Also, when the divided voltage becomes equal or lower than a voltage of 0 V minus the diode D4's forward voltage, the diode D4 turns on, maintaining the voltage at 0 V minus the diode D4's forward voltage.

A command for folding or a command for returning, from the switch circuit 18, is input to the CPU 20, and the CPU 20 outputs signals for turning on or off the FETs 3, 1, 4 and 2, from output terminals P1, P3, P4 and P6, respectively, to drive the motor 10 in the relevant direction. The operation of the motor 10 will be described for each drive direction.

(1) Case of Normal Rotation Driving

When the motor 10 is driven in normal rotation (here, driving in the folding direction), both the FETs 1 and 4 are turned on, and both the FETs 2 and 3 are turned off. As a result, current from the battery 22 flows in the sequence of the battery 22, the FET 1, the motor 10, the FET 4 and the ground, and the motor 10 is driven in normal rotation. During this driving, the CPU 20 periodically turns off either the FET 1 or the FET 4 for a necessary period of time to monitor the output voltage of the voltage detection circuit 14 or 16, and determines whether or not the motor 10 is locked. When the FET 1 or FET 4 is periodically turned on or off in order to drive the motor 10 under PWM (pulse-width modulation) control, the output voltage of the voltage detection circuit 14 or 16 can be monitored using an off period in that control. The operation for the case where the FET 1 is periodically turned off and that for the case where the FET 4 is periodically turned off will respectively be described below.

a) Case Where the FET 1 is Periodically Turned Off

Where the FET 1 on the high side (the high-potential side) is periodically turned off, the output voltage of the voltage detection circuit 14 is monitored. In other words, when the FET 1 is turned off during the normal rotation driving of the motor 10, the power supply from the battery 22 is interrupted and the motor 10 generates power by means of its inertial rotation. At this time, since the terminal 10b of the motor 10 is grounded via the FET 4, the potential of the terminal 10a of the motor 10 becomes positive by means of the generated voltage, and this positive potential is divided by the resistances R1 and R2 in the voltage detection circuit 14 and input to the A/D conversion input terminal P2 of the CPU 20. Meanwhile, when the FET 1 is turned off during the motor 10 being locked, since the voltage generated by the motor 10 is 0 V, the terminal 10a of the motor 10 enters a grounded state via the motor 10 and the FET 4. Accordingly, the voltage input to the A/D conversion input terminal P2 of the CPU 20 at this time becomes 0 V. In the CPU 20, a voltage between the voltage when the motor 10 inertially rotates during the FET 1 being off and the voltage when the motor 10 is locked during the FET 1 being off is set as a threshold value for the voltage input to the A/D conversion input terminal P2. The CPU 20 continues to drive the motor 10 when the voltage input to the A/D conversion input terminal P2 is equal or higher than this threshold value. Meanwhile, when the voltage is lower than the threshold value, the FET 1 is maintained to be off as it is, and further turns the FET 4 off to halt the driving of the motor 10.

Figure 2:
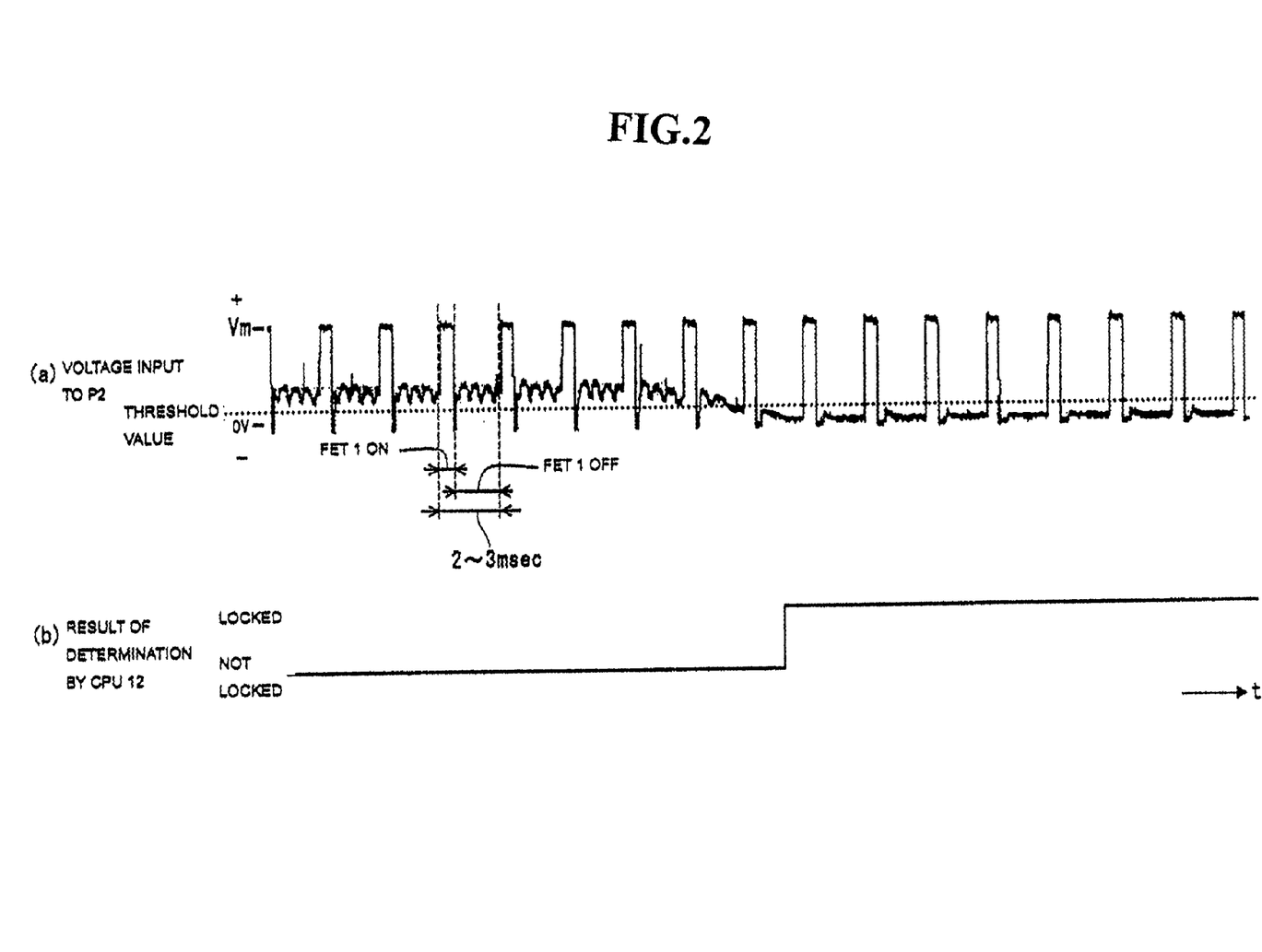
FIG. 2 is a diagram of the operation waveform where an FET 1 is periodically turned off during normal rotation driving (the operation waveform where an FET 2 is periodically turned off during reverse rotation driving in embodiment 1, and the operation waveform during normal rotation driving in embodiment 2 are the same as this one)

FIG. 2 shows an operation where of the FET 1 is periodically turned off. This operation is one where the FET 1 is periodically turned on or off in a manner such that the duty ratio can be varied, thereby driving the motor 10 under PWM control, and at that time, the output voltage of the voltage detection circuit 14 is monitored utilizing an off period of the FET 1. FIG. 2(a) indicates the voltage input to the A/D conversion input terminal P2 of the CPU 20. The FET 1 is repeatedly turned on or off in a cycle of 2 to 3 milliseconds. A voltage Vm of the input terminal P2 during the FET 1 being on is substantially equal to the voltage resulting from dividing the voltage of the battery 22 by the resistances R1 and R2. The voltage of the input terminal P2 when the FET 1 is off and the motor 10 is not locked becomes positive by means of the voltage generated by the motor 10 except a temporal decrease due to a surge voltage causing immediately after the FET 1 being turned off. Meanwhile, the voltage of the input terminal P2 when the FET 1 is off and the motor 10 is locked becomes 0 V since the motor 10 generates no power. Accordingly, a threshold value is set to a voltage between the voltage of the input terminal P2 when the FET 1 is off and the motor 10 is not locked, and the voltage of the input terminal P2 when the FET 1 is off and the motor 10 is locked, and the voltage value of the input terminal P2 is detected at a timing in which the part of the voltage decrease due to the surge voltage causing immediately after the FET 1 being turned off is excluded. Consequently, the CPU 20 can make determination of whether or not the motor 10 is locked, as shown in FIG. 2(b). According to this method in which the high-side FET 1 is periodically turned off, the voltage detected by the voltage detection circuit 14 during the FET 1 being off is determined according to the voltage generated by the motor 10, not depending on the voltage of the battery 22. Accordingly, even though the voltage of the battery 22 fluctuates, no effect thereof will be caused, making it possible to correctly make determination of whether or not the motor 10 is locked. When the CPU 20 determines the motor 10 as being in a locked state, it halts the driving of the motor 10. However, in FIG. 2(a), for the convenience of the explanation, the case where the FET 1 is repeatedly turned on and off after the motor 10 is determined as being locked (i.e., the driving of the motor 10 is not halted) is shown.

Although the CPU 20 can immediately determines the motor 10 as being locked once it detects the voltage of the input terminal P2 becoming lower than the threshold value, an erroneous detection may occur in this method. Therefore, it is possible to determine the motor 10 as being locked only by a voltage lower than the threshold value being consecutively detected a predetermined number of times. For example, the voltage value of the input terminal P2 is repeatedly detected plural times during one off period of the FET 1, and the motor 10 is determined as being locked when a voltage lower than the threshold value is consecutively detected a predetermined number of times. Alternatively, it is also possible to detect the voltage value of the input terminal P2 once during one off period of the FET 1 and determine the motor 10 as being locked when a voltage lower than the threshold value is consecutively detected a predetermined number of times during plural off periods of the FET 1.

b) Case Where the FET 4 is Periodically Turned Off (Pattern 1)

When the low side (the low-potential side) FET 4 is periodically turned off, the output voltage of the voltage detection circuit 16 is monitored. In other words, when the FET 4 is turned off during the motor 10 being driven in normal rotation, since the terminal 10b of the motor 10 is grounded via the resistances R3 and R4, which each have a large resistance value, the voltage applied to the motor 10 is greatly lowered, and the motor 10 generates powers by means of its inertial rotation. As a result, the voltage of the terminal 10b of the motor 10 becomes a voltage of the voltage of the battery 22 minus the voltage generated by the motor 10. This voltage is divided by the resistances R3 and R4 in the voltage detection circuit 16 and input to the A/D conversion input terminal P5 of the CPU 20. Meanwhile, when the FET 4 is turned off during the motor 10 being locked, since the voltage generated by the motor 10 is 0 V, the voltage of the terminal 10b of the motor 10 becomes substantially equal to the voltage of the battery 22. Accordingly, the voltage input to the A/D conversion input terminal P5 of the CPU 20 at this time becomes substantially equal to a voltage resulting from dividing the voltage of the battery 22 by the resistances R3 and R4. In the CPU 20, a voltage between the voltage when the motor 10 inertially rotates during the FET 4 being off and the voltage when the motor 10 is locked during the FET 4 being off is set as a threshold value for the voltage input to the A/D conversion input terminal P5. The CPU 20 continues to drive the motor 10 when the voltage input to the A/D conversion input terminal P5 is equal or lower than this threshold value. Meanwhile, when it is higher than the threshold value, the driving of the motor 10 is halted by maintaining the FET 4 to be off as it is and further turning the FET 1 off. In order to avoid an erroneous determination of whether or not the motor is locked, it is possible to determine the motor as being locked when a voltage higher than the threshold value is consecutively detected a predetermined number of times, as described above.

Figure 3:
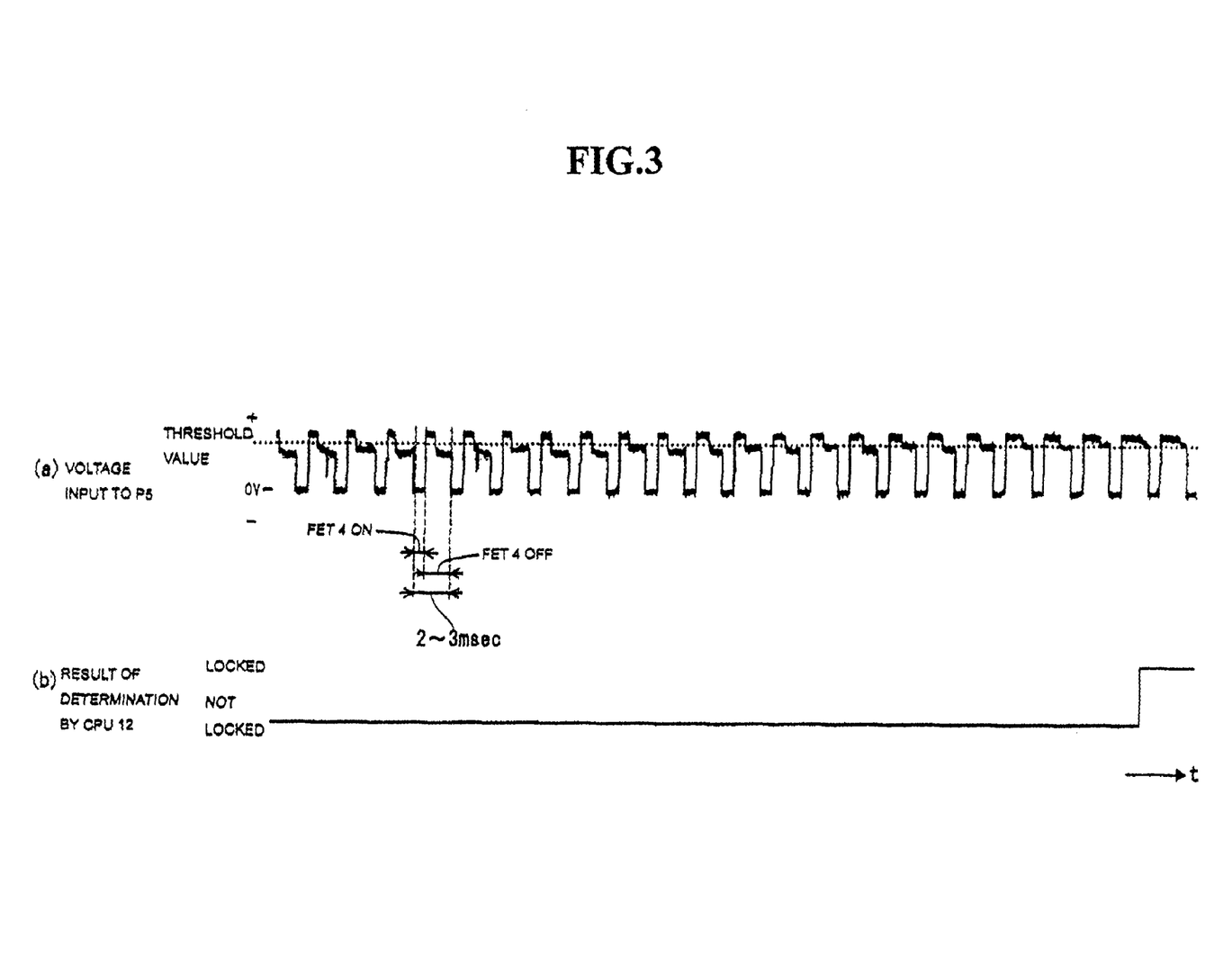
FIG. 3 is a diagram of the operation waveform where an FET 4 is periodically turned off during normal rotation driving in embodiment 1 (the operation waveform where an FET 3 is periodically turned off during reverse rotation driving in embodiment 1, and the operation waveform during reverse rotation driving in embodiment 2 are the same as this one)

FIG. 3 shows an operation where of the FET 4 is periodically turned off. This operation is one where the FET 4 is periodically turned on or off in a manner such that the duty ratio can be varied, thereby driving the motor 10 under PWM control, and at that time, the output voltage of the voltage detection circuit 16 is monitored utilizing an off period of the FET 4. FIG. 3(a) indicates the voltage input to the A/D conversion input terminal P5 of the CPU 20. The FET 4 is repeatedly turned on or off in a cycle of 2 to 3 milliseconds. The voltage of the input terminal P5 during the FET 4 being on is substantially 0 V. The voltage of the input terminal P5 when the FET 4 is off and the motor 10 is not locked becomes a voltage resulting from dividing a voltage of the voltage of the battery 22 minus the voltage generated by motor 10 by the resistances R3 and R4 except a temporal increase due to a surge voltage causing immediately after the FET 4 being turned off. Meanwhile, the voltage of the input terminal P5 when the FET 4 is off and the motor 10 is locked becomes substantially equal to a voltage resulting from dividing the voltage of the battery 22 by the resistances R3 and R4 since the motor 10 generates no power. Accordingly, a threshold value is set to a voltage between the voltage of the input terminal P5 when the FET 4 is off and the motor 10 is not locked, and the voltage of the input terminal P5 when the FET 4 is off and the motor 10 is locked, and the voltage value of the input terminal P5 is detected at a timing in which the part of the voltage increase due to the surge voltage causing immediately after the FET 4 being turned off is excluded. Consequently, the CPU 20 can make determination of whether or not the motor 10 is locked, as shown in FIG. 3(b). When the CPU 20 determines the motor 10 as being in a locked state, it halts the driving of the motor 10. However, in FIG. 3(a), for the convenience of the explanation, the case where the FET 4 is repeatedly turned on and off after the motor 10 is determined as being locked (i.e., the driving of the motor 10 is not halted) is shown.

Although the CPU 20 can immediately determines the motor 10 as being locked once it detects the voltage of the input terminal P5 becoming higher than the threshold value, an erroneous detection may occur in this method. Therefore, it is possible to determine the motor 10 as being locked only by a voltage higher than the threshold value being consecutively detected a predetermined number of times. For example, the voltage value of the input terminal P5 is repeatedly detected plural times during one off period of the FET 4, and the motor 10 is determined as being locked when a voltage higher than the threshold value is consecutively detected a predetermined number of times. Alternatively, it is also possible to detect the voltage value of the input terminal P5 once during one off period of the FET 4 and determine the motor 10 as being locked when a voltage higher than the threshold value is consecutively detected a predetermined number of times during plural off periods of the FET 4.

c) Case Where the FET 4 is Periodically Turned Off (Pattern 2)

According to the aforementioned "Case where the FET 4 is periodically turned off (pattern 1)" section, since the voltage of the terminal 10b of the motor 10 is affected by the fluctuation of the voltage of the battery 22, an erroneous detection (although the motor is locked, the motor locking is not detected, or although the motor is not locked, the motor locking is detected) may occur. Accordingly, it is possible that the CPU 20 calculates the difference between the voltage of the battery 22 detected by the voltage detection circuit 14 (this can be detected whether the FET 4 is on or off) and the voltage detected by the voltage detection circuit 16 during the FET 4 being off (the difference between the voltages input to the input terminals P2 and P5), and the motor 10 is determined as being in a locked state by detecting that that difference is lower than a predetermined threshold value. According to this, a locked state can be determined with the effect of the battery 22's voltage fluctuation eliminated.

(2) Case of Reverse Rotation Driving

When the motor 10 is driven in reverse rotation (here, driving in the returning direction), both the FETs 2 and 3 are turned on, and both the FETs 1 and 4 are turned off. As a result, current from the battery 22 flows in the sequence of the battery 22, the FET 2, the motor 10, the FET 3 and the ground, and the motor 10 is driven in reverse rotation. During this driving, either the FET 2 or the FET 3 is periodically turned off for a necessary period of time to monitor the output voltage of the voltage detection circuit 14 or 16, and determines whether or not the motor 10 is locked. When the FET 2 or FET 3 is periodically turned on or off in order to drive the motor 10 under PWM control, the output voltage of the voltage detection circuit 14 or 16 can be monitored using an off period in that control. The operation for the case where the FET 2 is periodically turned off and that for the case where the FET 3 is periodically turned off will respectively be described below.

a) Case where the FET 2 is Periodically Turned Off

Where the FET 2 on the high side is periodically turned off, the output voltage of the voltage detection circuit 16 is monitored. In other words, when the FET 2 is turned off during the reverse rotation driving of the motor 10, the power supply from the battery 22 is interrupted and the motor 10 generates power by means of its inertial rotation. At this time, since the terminal 10a of the motor 10 is grounded via the FET 3, the potential of the terminal 10b of the motor 10 becomes positive by means of the generated voltage, and this positive potential is divided by the resistances R3 and R4 in the voltage detection circuit 16 and input to the A/D conversion input terminal P5 of the CPU 20. Meanwhile, when the FET 2 is turned off during the motor 10 being locked, since the voltage generated by the motor 10 is 0 V, the terminal 10b of the motor 10 enters a grounded state via the motor 10 and the FET 3. Accordingly, the voltage input to the A/D conversion input terminal P5 of the CPU 20 at this time becomes 0 V. In the CPU 20, a voltage between the voltage when the motor 10 inertially rotates during the FET 2 being off and the voltage when the motor 10 is locked during the FET 2 being off is set as a threshold value for the voltage input to the A/D conversion input terminal P5. The CPU 20 continues to drive the motor 10 when the voltage input to the A/D conversion input terminal P5 is equal or higher than this threshold value. Meanwhile, when the voltage is lower than the threshold value, the FET 2 is maintained to be off as it is, and further turns the FET 3 off to halt the driving of the motor 10. According to this method in which the high-side FET 2 is periodically turned off, the voltage detected by the voltage detection circuit 16 during the FET 2 being off is determined according to the voltage generated by the motor 10, not depending on the voltage of the battery 22. Accordingly, even though the voltage of the battery 22 fluctuates, no effect thereof will be caused, making it possible to correctly make determination of whether or not the motor 10 is locked. The operation waveform where the FET 2 is periodically turned off is similar to the aforementioned one shown in FIG. 2.

b) Case Where the FET 3 is Periodically Turned Off (Pattern 1)

When the low side (low-potential side) FET 3 is periodically turned off, the output voltage of the voltage detection circuit 14 is monitored. In other words, when the FET 3 is turned off during the motor 10 being driven in reverse rotation, since the terminal 10a of the motor 10 is grounded via the resistances R1 and R2, which each have a large resistance value, the voltage applied to the motor 10 is greatly lowered, and the motor 10 generates powers by means of its inertial rotation. As a result, the voltage of the terminal 10a of the motor 10 becomes a voltage of the voltage of the battery 22 minus the voltage generated by the motor 10. This voltage is divided by the resistances R1 and R2 in the voltage detection circuit 14 and input to the A/D conversion input terminal P2 of the CPU 20. Meanwhile, when the FET 3 is turned off during the motor 10 being locked, since the voltage generated by the motor 10 is 0 V, the terminal 10a of the motor 10 becomes substantially equal to the voltage of the battery 22. Accordingly, the voltage input to the A/D conversion input terminal P2 of the CPU 20 at this time becomes substantially equal to a voltage resulting from dividing the voltage of the battery 22 by the resistances R1 and R2. In the CPU 20, a voltage between the voltage when the motor 10 inertially rotates during the FET 3 being off and the voltage when the motor 10 is locked during the FET 3 being off is set as a threshold value for the voltage input to the A/D conversion input terminal P2. The CPU 20 continues to drive the motor 10 when the voltage input to the A/D conversion input terminal P2 is equal or lower than this threshold value. Meanwhile, when it is higher than the threshold value, the driving of the motor 10 is halted by maintaining the FET 3 to be off as it is and further turning the FET 1 off. In order to avoid an erroneous determination of whether or not the motor is locked, it is possible to determine the motor as being locked when a voltage higher than the threshold value is consecutively detected a predetermined number of times, as described above. The operation waveform where the FET 3 is periodically turned off is similar to the aforementioned one shown in FIG. 3.

c) Case Where the FET 3 is Periodically Turned Off (Pattern 2)

According to the aforementioned "Case where the FET 3 is periodically turned off (pattern 1)" section, since the voltage of the terminal 10a of the motor 10 is affected by the fluctuation of the voltage of the battery 22, an erroneous detection (although the motor is locked, the motor locking is not detected, or although the motor is not locked, the motor locking is detected) may occur. Accordingly, it is possible that the CPU 20 calculates the difference between the voltage of the battery 22 detected by the voltage detection circuit 16 (this can be detected whether the FET 3 is on or off) and the voltage detected by the voltage detection circuit 14 during the FET 3 being off (the difference between the voltages input to the input terminals P5 and P2), and the motor 10 is determined as being in a locked state by detecting that the difference is lower than a predetermined threshold value. According to this, a locked state can be determined with the effect of the battery 22's voltage fluctuation eliminated.

As described above, the case where the motor 10 is driven in normal rotation includes methods in which the FET 1 is periodically turned off and in which the FET 4 is periodically turned off, while the case where the motor 10 is driven in reverse rotation includes methods in which the FET 2 is periodically turned off and in which the FET 3 is periodically turned off. Among these, a combination of the methods in which the high-side FET 1 is periodically turned off during normal rotation driving and in which the high-side FET 2 is periodically turned off during reverse rotation driving can be considered most desirable because determination of whether or not the motor 10 is locked can be made with no effect of voltage fluctuations of the battery 22. Also, in the case of a combination of the methods in which the low-side FET 4 is periodically turned off during normal rotation driving and in which the low-side FET 3 is periodically turned off during reverse rotation driving, it can be considered desirable to determine whether or not the motor 10 is locked according to the difference between the voltages of the input terminals P2 and P5 in order to eliminate the effect of voltage fluctuations of the battery 22.

Embodiment 2

Figure 4:
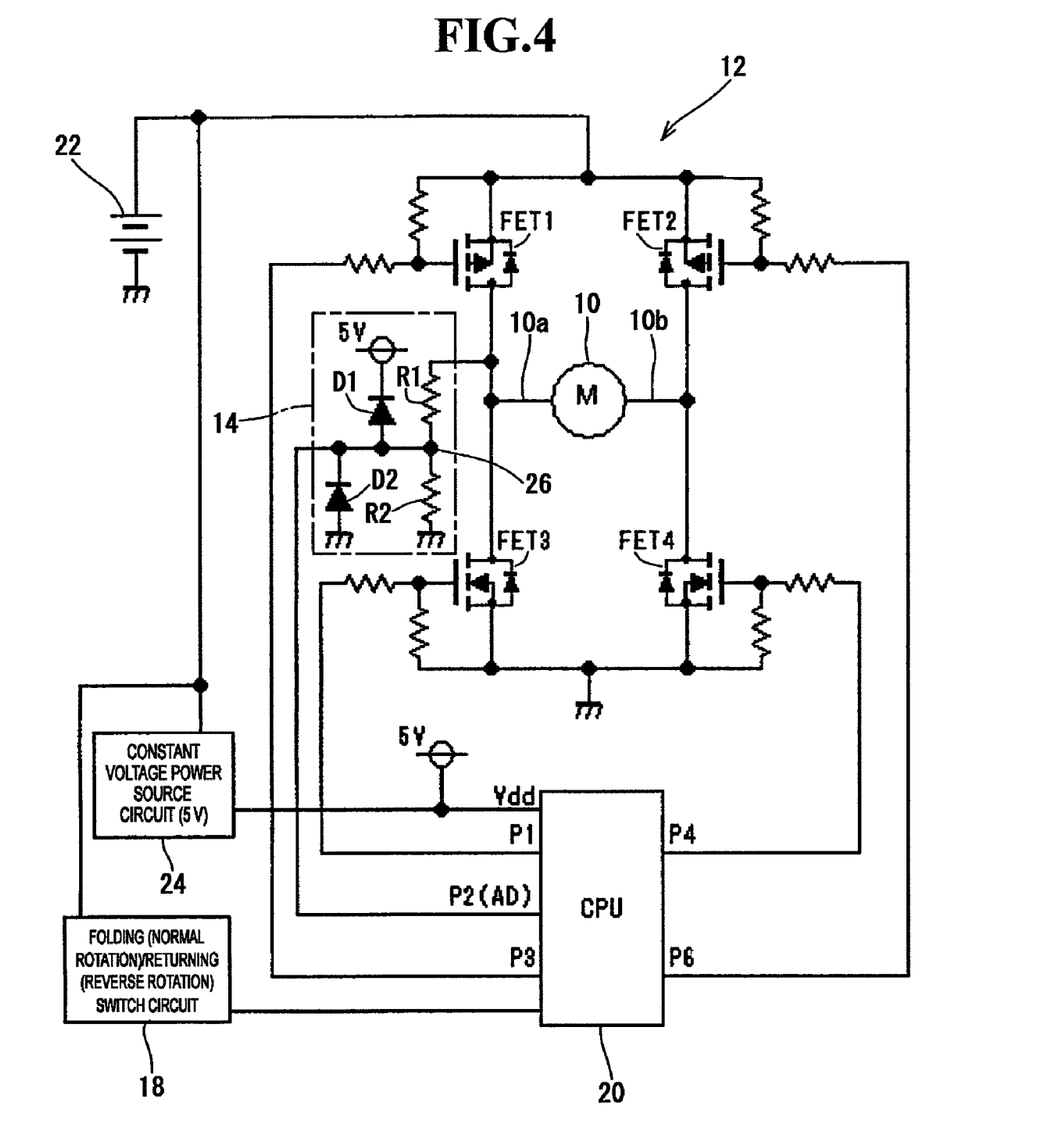
FIG. 4 is a diagram of a circuit according to embodiment 2 of the present invention.

Another embodiment of the present invention is shown in FIG. 4. The same reference numerals are used for the parts in common to those in FIG. 1. This embodiment is constructed by removing the voltage detection circuit 16 from the embodiment in FIG. 1 to determine whether or not the motor 10 is in a locked state, using a voltage detected by the voltage detection circuit 14 both during normal rotation driving and reverse rotation driving of the motor 10. In this embodiment, during normal rotation driving, the FET 1 is periodically turned off, and during reverse rotation driving, the FET 3 is periodically turned off. The operation for each driving direction will be described below.

(1) Case of Normal Rotation Driving

The operation is the same as those in the aforementioned "a) Case where the FET 1 is periodically turned off" section in "(1) Case of normal rotation driving" in embodiment 1. The operation waveform is similar to the aforementioned one shown in FIG. 2.

(2) Case of Reverse Rotation Driving

The Operation is the Same as Those in the Aforementioned "b) Case where the FET 3 is periodically turned off" section in "(2) Case of reverse rotation driving" in embodiment 1. The operation waveform is similar to the aforementioned one shown in FIG. 3.

What is claimed is:

1. A lock detection method for a motor for a power-folding mirror, a direct current brush motor for the power-folding mirror being reversibly driven by an H-bridge driver formed of four switching elements, a pair of the four switching elements supplying power to the direct current brush motor, the method comprising:

periodically turning off one switching element of the pair of switching elements, which are on, from among the four switching elements;

detecting a voltage of a part whose voltage changes according to a voltage generated by the direct current brush motor during an off period corresponding to the periodically turning off of the one switching element; and determining whether the direct current brush motor is in a locked state according to whether the detected voltage crosses a predetermined voltage between a voltage when the direct current brush motor is locked and a voltage when the direct current brush motor is not locked.

2. A lock detector for a motor for a power-folding mirror, the lock detector comprising:

an H-bridge driver that reversibly drives a direct current brush motor for the power-folding mirror via four switching elements, a pair of the four switching elements supplying power to the direct current brush motor;

a voltage detector that detects a voltage of a part whose voltage changes according to a voltage generated by the direct current brush motor; and a lock determiner that periodically turns off one switching element of the pair of switching elements, which are on, from among the four switching elements, and determines whether the direct current brush motor is in a locked state according to whether a voltage detected by the voltage detector during an off period corresponding to the periodically turning off of the one switching element crosses a predetermined voltage between a voltage when the direct current brush motor is locked and a voltage when the direct current brush motor is not locked.

3. A lock detector for a motor for a power-folding mirror, the lock detector comprising:

an H-bridge driver for the motor for the power-folding mirror, the H-bridge driver having a first, a second, a third and a fourth switching element, one end of the first switching element and one end of the third switching element being interconnected, one end of the second switching element and one end of the fourth switching element being interconnected, another end of each of the first and second switching elements being connected to a battery, another end of each of the third and fourth switching elements being grounded, a direct current brush motor being connected between a connection point of the first and third switching elements and a connection point of the second and fourth switching elements, the H-bridge driver driving the direct current brush motor in one direction by turning the first and fourth switching elements on and turning the second and third switching elements off, and driving the direct current brush motor in an opposite direction by turning the second and third switching elements on and turning the first and fourth switching elements off;

a first voltage detector having a resistance connected between one terminal of the direct current brush motor and a ground, the first voltage detector generating a voltage according to a potential of the one terminal of the direct current brush motor;

a second voltage detector having a resistance connected between another terminal of the direct current brush motor and the ground, the second voltage detector generating a voltage according to a potential of the another terminal of the direct current brush motor; and a lock determiner that, during the direct current brush motor being driven in the one direction by turning the first and fourth switching elements on and turning the second and third switching elements off, periodically turns the first switching element off and determines the direct current brush motor to be in a locked state when a voltage generated at the first voltage detector during an off period is lower than a predetermined threshold value set to a voltage between a voltage when the direct current brush motor is not locked and a voltage when the direct current brush is locked, periodically turns the fourth switching element off and determines the direct current brush motor as being in the locked state when a voltage generated at the second voltage detector during the off period is higher than the predetermined threshold value set to the voltage between the voltage when the direct current brush motor is not locked and the voltage when the direct current brush motor is locked, or periodically turns the fourth switching element off and determines the direct current brush motor as being in the locked state when a difference between the voltage generated at the first voltage detector and the voltage generated at the second voltage detector during the off period is lower than the predetermined threshold value set to the voltage between the voltage when the direct current brush motor is not locked and the voltage when the direct current brush motor is locked, and during the direct current brush motor being driven in the opposite direction by turning the second and third switching elements on and turning the first and fourth switching elements off, periodically turns the second switching element off and determines the direct current brush motor as being in the locked state when the voltage generated at the second voltage detector during the off period is lower than the predetermined threshold value set to the voltage between the voltage when the direct current brush motor is not locked and the voltage when the direct current brush motor is locked, periodically turns the third switching element off and determines the direct current brush motor as being in the locked state when the voltage generated at the first voltage detector during the off period is higher than the predetermined threshold value set to the voltage between the voltage when the direct current brush motor is not locked and the voltage when the direct current brush motor is locked, or periodically turns the third switching element off and determines the direct current brush motor as being the locked state when the difference between the voltage generated at the second voltage detector and the voltage generated at the first voltage detector during the off period is lower than the predetermined threshold value set to the voltage between the voltage when the direct current brush motor is not locked and the voltage when the direct current brush motor is locked.

4. A lock detector for a motor for a power-folding mirror, the lock detector comprising:

an H-bridge driver for the motor for the power-folding mirror, the H-bridge driver having a first, a second, a third and a fourth switching element, one end of the first switching element and one end of the third switching element being interconnected, one end of the second switching element and one end of the fourth switching element being interconnected, another end of each of the first and second switching elements being connected to a battery, another end of each of the third and fourth switching elements being grounded, a direct current brush motor being connected between a connection point of the first and third switching elements and a connection point of the second and fourth switching elements, the H-bridge driver driving the direct current brush motor in one direction by turning the first and fourth switching elements on and turning the second and third switching elements off, and driving the direct current brush motor in an opposite direction by turning the second and third switching elements on and turning the first and fourth switching elements off;

a voltage detector having a resistance connected between one terminal of the direct current brush motor and a ground, the voltage detector generating a voltage according to a potential of the one terminal of the direct current brush motor; and a lock determiner that, during the direct current brush motor being driven in the one direction by turning the first and fourth switching elements on and turning the second and third switching elements off, periodically turns the first switching element off and determines the direct current brush motor to be in a locked state when a voltage generated at the voltage detector during an off period is lower than a predetermined threshold value set to a voltage between a voltage when the direct current brush motor is not locked and a voltage when the direct current brush is locked, and during the direct current brush motor being driven in the opposite direction by turning the second and third switching elements on and turning the first and fourth switching elements off, periodically turns the third switching element off and determines the direct current brush motor to be in the locked state when a voltage generated at the voltage detector during the off period is higher than the predetermined threshold value set to the voltage between the voltage when the direct current brush motor is not locked and the voltage when the direct current brush motor is locked.

* * * * *